US008392893B2

(12) United States Patent
Fujihara

(10) Patent No.: US 8,392,893 B2
(45) Date of Patent: Mar. 5, 2013

(54) EMULATION METHOD AND COMPUTER SYSTEM

(75) Inventor: Tsutomu Fujihara, Kofu (JP)

(73) Assignee: NEC Computertechno, Ltd., Yamanashi (JP)

( * ) Notice: Subject to any disclaimer, the term of this patent is extended or adjusted under 35 U.S.C. 154(b) by 1148 days.

(21) Appl. No.: 11/798,223

(22) Filed: May 11, 2007

(65) Prior Publication Data

US 2007/0271084 A1    Nov. 22, 2007

(30) Foreign Application Priority Data

May 17, 2006  (JP) .................................. 2006/137587

(51) Int. Cl.
G06F 9/44 (2006.01)
G06F 9/45 (2006.01)
G06F 7/38 (2006.01)
G06F 9/00 (2006.01)

(52) U.S. Cl. ........ 717/134; 717/138; 717/151; 712/233; 712/234; 712/236; 712/237; 712/239; 712/240

(58) Field of Classification Search .................... 703/23, 703/26; 717/134, 138, 151; 712/233, 234, 712/236, 237, 239, 240
See application file for complete search history.

(56) References Cited

U.S. PATENT DOCUMENTS

| 4,951,195 | A | * | 8/1990 | Fogg et al. ........................ 703/20 |
| 5,210,832 | A | * | 5/1993 | Maier et al. .................... 712/227 |
| 5,560,013 | A | * | 9/1996 | Scalzi et al. .................. 717/138 |
| 5,574,873 | A | * | 11/1996 | Davidian ..................... 712/200 |
| 5,751,982 | A | * | 5/1998 | Morley .......................... 712/209 |
| 5,878,254 | A | * | 3/1999 | Shimada et al. ............... 712/238 |
| 6,055,371 | A | * | 4/2000 | Okano ........................... 717/160 |
| 6,324,686 | B1 | | 11/2001 | Komatsu et al. |
| 6,336,178 | B1 | * | 1/2002 | Favor .............................. 712/23 |
| 6,976,157 | B1 | * | 12/2005 | Sinharoy ....................... 712/239 |
| 7,356,810 | B2 | * | 4/2008 | Souloglou et al. ............ 717/146 |
| 7,428,727 | B2 | * | 9/2008 | Alverson et al. .............. 717/134 |
| 7,506,321 | B1 | * | 3/2009 | Irving et al. ................. 717/138 |
| 2003/0130834 | A1 | * | 7/2003 | Krishnan ........................ 703/26 |
| 2004/0054993 | A1 | * | 3/2004 | Nair et al. ..................... 717/138 |
| 2005/0132345 | A1 | * | 6/2005 | Pessolano .................... 717/159 |
| 2007/0169031 | A1 | * | 7/2007 | Harris .......................... 717/140 |
| 2007/0276646 | A1 | * | 11/2007 | Dutt et al. ....................... 703/22 |

FOREIGN PATENT DOCUMENTS

| JP | 64-82131 | 3/1989 |
| JP | 8-305583 | 11/1996 |
| JP | 11-175349 | 7/1999 |
| JP | 2001/306334 | 11/2001 |
| JP | 2004/127154 | 4/2004 |
| JP | 2005/63165 | 3/2005 |

OTHER PUBLICATIONS

Japanese Office Action dated Jan. 4, 2011 in corresponding Japanese Application No. 2006-137587 with English translation of Japanese Examiner's comments in Office Action.

* cited by examiner

*Primary Examiner* — Emerson Puente
*Assistant Examiner* — Charles Swift
(74) *Attorney, Agent, or Firm* — Young & Thompson

(57) ABSTRACT

The computer system of the present invention emulates target instructions. The computer system includes a processing unit for branching to collective emulation coding for emulating plural of target instructions created beforehand collectively, thereby processing those instructions collectively according to the coding when those target instructions are combined so as to be processed collectively and a memory for storing the collective emulation coding.

29 Claims, 22 Drawing Sheets

FIRST TARGET INSTRUCTIONS

|  |  | A | B | C |
|---|---|---|---|---|
| SECOND TARGET INSTRUCTIONS | A | NG | OK | NG |
|  | B | NG | NG | NG |
|  | C | NG | NG | NG |

[addt INSTRUCTION]

| 0 | 7 | 8 | 12 | 15 |
|---|---|---|---|---|
| CODE = 01# | | GR2 | | GR1 |

[subt INSTRUCTION]

| 0 | 7 | 8 | 12 | 15 |
|---|---|---|---|---|
| CODE = 02# | | GR4 | | GR3 |

FIG. 4

```
INSTRUCTION FETCHING/DECODING
{.mmi
         ld1      INST  = [IC]              //FETCH INSTRUCTION FROM IC (INSTRUCTION COUNTER)
};;
{.mmi
         cmp. eq  taddt = 0x01, INST        //INSTRUCTION DECODING: addt FLAG="1" AND OTHERS ="0" FOR addt
         cmp. eq  tsubt = 0x02, INST        //INSTRUCTION DECODING: subt FLAG="1" AND OTHERS ="0" FOR subt
         . . .                              //INSTRUCTION DECODING FOR OTHER THAN THE ABOVE
};;
{.mbb
(taddt)  br. cond. dptk    INST_ADDT        //BRANCH TO addt INSTRUCTION CODING AT taddt=1
(tsubt)  br. cond. dptk    INST_SUBT        //BRANCH TO tsubt INSTRUCTION CODING AT tsubt=1
         . . .                              //BRANCH TO OTHER INSTRUCTION CODING
};;
```

FIG. 5

```
EXECUTION OF addt INSTRUCTION
INST_ADDT:
{.mmi
        ld1       GRINF    = [IC+1]                              //READ GR INFORMATION
};
{.mmi
        and       GR1      = 0xF, GRINF                          //READ GR1 INFORMATION
        shr. u    GR2      = GRINF,_SH08                         //READ GR2 INFORMATION
};
{.mmi
        shl add   GR1add   = GR1,_SH02, GRbaseadd                //GENERATE READ ADDRESS FROM GR1 INFORMATION
        shl add   GR2add   = GR2,_SH02, GRbaseadd                //GENERATE READ ADDRESS FROM GR2 INFORMATION
};
{.mmi
        ld4       GR1      = [GR1add]                            //READ GR1 INFORMATION
        ld4       GR2      = [GR2add]                            //READ GR2 INFORMATION
};
{.mmi
        add       GR2      = GR1, GR2                            //EXECUTE GR1 + GR2
};
{.mmi
        tbit. nz  terr     = GR2,_bit31                          //CHECK OVERFLOW
};
{.mmb
 (terr) br. cond. dptk     ADDT_EXCEPTION                        //BRANCH TO EXCEPTION PROCESSING UNIT
};
{.mmb
        st4       [GR2add]=GR2                                   //STORE RESULT OF ADDITION IN GR2
        br        INST_END                                       //BRANCH TO POST-PROCESSING BLOCK
};
```

FIG. 6

```
EXECUTION OF subt INSTRUCTION
INST_SUBT:
{.mmi
            ld1      GRINF   = [IC+1]                              //READ GR INFORMATION
};;
{.mmi
            and      GR3     = 0xF, GRINF                          //READ GR1 INFORMATION
            shr.u    GR4     = GRINF._SH08                         //READ GR2 INFORMATION
};;
{.mmi
            shladd   GR3add  = GR3,_SH02, GRbaseadd                //GENERATE READ ADDRESS FROM GR3 INFORMATION
            shladd   GR4add  = GR4,_SH02, GRbaseadd                //GENERATE READ ADDRESS FROM GR4 INFORMATION
};;
{.mmi
            ld4      GR3     = [GR3add]                            //READ GR3 INFORMATION
            ld4      GR4     = [GR4add]                            //READ GR4 INFORMATION
};;
{.mmi
            sub      GR4     = GR3, GR4                            //EXECUTE GR3 - GR4
};;
{.mmi
            st4      [GR2add]=GR4                                  //STORE RESULT OF SUBTRACTION IN GR4
            br       INST_END                                      //BRANCH TO POST-PROCESSING BlOCK
};;
```

FIG. 7

```
POST- PROCESSING OF INSTRUCTION
INST_END:
{.mmi
        add    IC    = IC+3              //UPDATE INSTRUCTION COUNTER
};
```

FIG. 8

```
INSTRUCTION FETCHING / DECODING
{.mmi
        ld1        INST   = [IC]         //FETCH INSTRUCTION FROM IC (INSTRUCTION COUNTER)
        ld1        INST2  = [IC+3]       //FETCH NEXT INSTRUCTION PRECEDINGLY
};;
{.mmi
        cmp. eq    taddt  = 0x01, INST   //INSTRUCTION DECODING: taddt FLAG="1" ONLY FOR addt
        cmp. eq    tsubt  = 0x02, INST   //INSTRUCTION DECODING: tsubt FLAG="1" ONLY FOR subt
        . . . . .                        //INSTRUCTION DECODING FOR OTHER THAN THE ABOVE
};;
{.mmi
  (taddt)  cmp. eq. unc  tadsu = 0x02, INST2  //tadsu FLAG="1" ONLY FOR CURRENT subt AND NEXT subt
};;
{.bbb
  (tadsu)  br. cond. dptk  INST_ADDT-SUBT   //BRANCH TO CODING OF addt AND subt COMBINATION
  (taddt)  br. cond. dptk  INST_ADDT        //BRANCH TO addt INSTRUCTION CODING AT taddt=1
  (tsubt)  br. cond. dptk  INST_SUBT        //BRANCH TO subt INSTRUCTION CODING AT tsubt=1
};;                                          //BRANCH TO OTHER INSTRUCTION CODING
```

FIG. 9

```
EXECUTION OF addt AND subt COMBINATION
INST_ADDT-SUBT:
{ .mmi
    ld1     GRINF   = [IC+1]                             //READ GR INFORMATION OF addt INSTRUCTION
    ld1     GRINF2  = [IC+3]                             //READ GR INFORMATION OF subt INSTRUCTION
};;
{ .mmi
    and     GR1     = 0xF, GRINF                         //READ GR1 INFORMATION
    shr.u   GR2     = GRINF, _SH08                       //READ GR2 INFORMATION
};;
{ .mmi
    and     GR3     = 0xF, GRINF2                        //READ GR3 INFORMATION
    shr.u   GR4     = GRINF2, _SH08                      //READ GR4 INFORMATION
};;
{ .mmi
    shl add GR1add  = GR1, _SH02, GRbaseadd              //GENERATE READ ADDRESS FROM GR1 INFORMATION
    shl add GR2add  = GR2, _SH02, GRbaseadd              //GENERATE READ ADDRESS FROM GR2 INFORMATION
};;
{ .mmi
    shl add GR3add  = GR3, _SH02, GRbaseadd              //GENERATE READ ADDRESS FROM GR3 INFORMATION
    shl add GR4add  = GR4, _SH02, GRbaseadd              //GENERATE READ ADDRESS FROM GR4 INFORMATION
};;
{ .mmi
    ld4     GR1     = [GR1add]                           //READ GR1 INFORMATION
    ld4     GR2     = [GR2add]                           //READ GR2 INFORMATION
};;
{ .mmi
    ld4     GR3     = [GR3add]                           //READ GR3 INFORMATION
    ld4     GR4     = [GR4add]                           //READ GR4 INFORMATION
};;
{ .mmi
    add     GR2     = GR1, BR2                           //EXECUTE GR1 + GR2
};;
{ .mmi
    sub     GR3     = GR3, BR4                           //EXECUTE GR3 - GR4
    tb/t.nz terr    = GR2, _bit3l                        //CHECK OVERFLOW
};;
    cmp.eq.  tcomb, fcomb = 0x02, INST2                  //SET tcomb FLAG=1, fcomb FLAG=0
(terr) br.cond.dptk ADDT_EXCEPTION                       //BRANCH TO EXCEPTION PROCESSING UNIT
{ .mmb
    st4     [GR2add] = GR2                               //STORE RESULT IN GR2
    st4     [GR3add] = GR3                               //STORE RESULT IN GR3
    br      INST_END                                     //BRANCH TO POST-PROCESSING BLOCK
};;
```

FIG. 10

```
POST-PROCESSING OF INSTRUCTION
INST_END:
{.mmi
        (tcomb) add    IC   = IC+6        //UPDATE INSTRUCTION COUNTER (+6 FOR INSTRUCTION COMBINATION)
        (fcomb) add    IC   = IC+3        //UPDATE INSTRUCTION COUNTER (+3 FOR SINGLE INSTRUCTION)

```
INSTRUCTION FETCHING / DECODING
{.mmi
        ld1     INST   = [IC]           //FETCH INSTRUCTION FROM IC (INSTRUCTION COUNTER)
        ld1     INST2  = [IC+3]         //FETCH NEXT INSTRUCTION PRECEDINGLY
};;
{.mmi
        ld1     INST3  = [IC+6]         //FETCH INSTRUCTION AFTER NEXT cmp.eq  taddt  = 0x01, INST     //INSTRUCTION DECODING: taddt FLAG="1" ONLY FOR addt
        cmp.eq  tsubt  = 0x02, INST     //INSTRUCTION DECODING: tsubt FLAG="1" ONLY FOR subt
        . . .                           //INSTRUCTION DECODING FOR OTHER THAN THE ABOVE
};;
{.mmi
 (taddt) cmp.eq.unc tadsu = 0x02, INST2 //tadsu FLAG="1" ONLY FOR CURRENT subt AND NEXT subt
};;
{.mmi
 (tadsu) cmp.eq.unc t3mix = 0x02, INST3 //t3rd FLAG="1" ONLY FOR CURRENT addt, NEXT subt, AND
                                        //  MATCHED INSTRUCTION AFTER NEXT
};;
{.bbb
 (t3mix) br.cond.dptk INST-3MIX         //BRANCH TO CODING COMBINATION OF THREE INSTRUCTIONS (tadsu) br.cond.dptk INST_ADDT-SUBT    //BRANCH TO CODING OF addt AND subt COMBINATION
 (taddt) br.cond.dptk INST_ADDT         //BRANCH TO addt INSTRUCTION CODING AT taddt=1
 (tsubt) br.cond.dptk INST_SUBT         //BRANCH TO tsubt INSTRUCTION CODING AT tsubt=1
        . . .                           //BRANCH TO OTHER INSTRUCTION CODING
};;
```

FIG. 12

```
INSTRUCTION FETCHING / DECODING
{.mmi      ld1       INST    = [IC]                      //FETCH INSTRUCTION FROM IC (INSTRUCTION COUNTER)
           ld1       INST2   = [IC+3]                    //FETCH NEXT INSTRUCTION PRECEDINGLY
};;
{.mmi
           cmp. eq   taddt   = 0x01, INST                //INSTRUCTION DECODING: taddt FLAG="1" ONLY FOR addt
           cmp. eq   tsubt   = 0x02, INST                //INSTRUCTION DECODING: tsubt FLAG="1" ONLY FOR subt
           . . . .                                       //INSTRUCTION DECODING FOR OTHER THAN THE ABOVE
};;
{.mmi
  (taddt)  cmp. eq. unc tadsu, fadsu = 0x02, INST2       //tadsu FLAG="1" ONLY FOR CURRENT addt AND NEXT subt
                                                         //tadsu FLAG="1" NOT FOR CURRENT addt AND NEXT subt
};;
{.mmi
  (fadsu)  br. cond. dptk  3MIXCHK_SKIP                  //SKIP COMBINATION CHECK BECAUSE fadsu FLAG="1" DOES
                                                         //NOT INDICATE COMINATION
};;
{.mmi
  (tadsu)  cmp. eq. unc t3mix = 0x03, INST3              //t3rd FLAG="1" ONLY FOR CURRENT addt, NEXT subt, AND
                                                         //MATCHED INSTRUCTION AFTER NEXT
};;
{.mmi
  (t3mix)  br. cond. dptk  INST-3MIX                     //BRANCH TO CODING COMBINATION OF THREE INSTRUCTIONS
};;
3MIXCHK_SKIP:
{.bbb
  (tadsu)  br. cond. dptk  INST_ADDT-SUBT                //BRANCH TO CODING OF addt AND subt COMBINATION
  (taddt)  br. cond. dptk  INST_ADDT                     //BRANCH TO addt INSTRUCTION CODING AT taddt=1
  (tsubt)  br. cond. dptk  INST_SUBT                     //BRANCH TO tsubt INSTRUCTION CODING AT tsubt=1
  . . . .                                                //BRANCH TO OTHER INSTRUCTION CODING
};;
```

FIG. 13

| PROCESS NAME | INSTRUCTION COUNTER | CODING BRANCH DESTINATION |
|---|---|---|
| PROCESS NAME | INSTRUCTION COUNTER | CODING BRANCH DESTINATION |
| PROCESS NAME | INSTRUCTION COUNTER | CODING BRANCH DESTINATION |
| PROCESS NAME | INSTRUCTION COUNTER | CODING BRANCH DESTINATION |

FIG. 14

| INSTRUCTION AB | CODING BRANCH DESTINATION |

FIG. 18

| | | |
|---|---|---|
| INSTRUCTION A | INSTRUCTION AB | CODING BRANCH DESTINATION |
| INSTRUCTION B | INSTRUCTION BC | CODING BRANCH DESTINATION |
| INSTRUCTION C | NONE | — |

FIG. 19

EMULATION METHOD AND COMPUTER SYSTEM

BACKGROUND OF THE INVENTION

FIELD OF THE INVENTION

There are two well-known emulation methods for enabling another system (OS, CPU, or the like) to function on a base system; emulation by hardware and emulation by software. The present invention relates to the latter emulation method, that is, an emulation method by software, and a computer system.

INCORPORATION BY REFERENCE

This application is based upon and claims the benefit of priority from Japanese patent application No. 2006-137857, filed on May 17, 2006, the disclosure of which is incorporated herein in its entirety by reference.

DESCRIPTION OF THE RELATED ART

When realizing the functions of, for example, an OS of another system (hereinafter, to be referred to as a target system) on a base system, each of the conventional computer systems executes emulation for the instructions of a target system (hereinafter, to be referred to as target instructions) individually.

FIG. 24 shows a flowchart of the processing procedures of such a conventional emulation method.

As shown in FIG. 24, at the time of emulation, the computer system fetches one target instruction first (step 2-1), then decodes the fetched instruction (step 2-2). After that, the computer system executes the processing of the target instruction according to the decoding result (step 2-3). Ending the processing, the computer system executes a predetermined ending processing corresponding to the instruction (step 2-4). At this time, the computer system substitutes the target instruction for a base system instruction to execute the processing.

In the case of such an emulation method, however, the target system emulation speed depends significantly on how much the host system hardware performance is improved for executing each processing according to each target instruction; the emulation speed is not improved as long as the host system's hardware performance is not improved.

This is why there have been various emulation methods examined so far to improve such target system emulation speeds. For example, JP 2004-127154 A discloses an emulation method for quickening emulation processings by dividing a target instruction emulation processing according to the number of processors of a subject computer system and enabling each processor to execute a divided processing in parallel to other divided processings by other processors. JP 2001-306334A also discloses another emulation method for quickening emulation of a target program by fetching precedingly the target instruction to be processed next during the emulation.

Furthermore, JP 2005-063165 A discloses still another emulation method for quickening the emulation speed by using a decoding cache, which fetches instructions and storing their decoding results so that each decoding result is stored in the decoding cache at the time of the first execution of the target instruction, thereby reusing the content in the decoding cache upon the next execution of the same instruction. And JP 2005-063165 A also discloses an emulation method for quickening the emulation speed by registering an execution processing address (the start address of an execution processing routine) corresponding to a decoded target instruction in a decoding cache, thereby substituting the decoding of a registered target instruction for a simple processing of just referring to a table.

Among the above described conventional computer systems, the configuration of the computer system disclosed in JP 2004-127154 A confronts a problem that the system is expanded in scale, since some additional units are required to determine the number of processors, divide each emulation processing, assign a divided processing to each processor, and collect the processing result of each processor. And an instruction emulation dividing unit is required for such processings.

As described above, the configuration of the computer system disclosed in JP 2001-306334 A quickens only the fetching of target instructions and the configuration of the computer system disclosed in JP 2005-063165 A quickens only the decoding of target instructions. However, they do not quicken other processings. Thus, both of the methods will not be effective so much to improve the emulation speed.

SUMMARY OF THE INVENTION

Under such circumstances, it is an object of the present invention to provide an emulation method and a computer system capable of improving the emulation speed of a target system respectively.

In order to achieve the above object, an emulation method of the present invention emulates target instructions as follows. For a combination of plural target instructions to be processed collectively, the emulation method of the present invention branches to collective emulation coding for emulating plural target instructions created beforehand collectively and emulates those target instructions according to the coding.

The computer system of the present invention, which emulates target instructions as described above consist of a processing unit for branching to the collective emulation coding for plural target instructions to be processed collectively and processes those target instructions according to the coding, as well as a memory for storing the collective emulation coding.

Because the emulation method and the computer system as described above can branch to the collective emulation coding for each combination of plural target instructions and processes those target instructions collectively according to the coding, the method and the system can process a predetermined plurality of target instructions collectively.

According to the present invention, therefore, because plural target instructions can be processed collectively as described above, the emulation speed can be improved without adding any emulation-dedicated hardware to the base system.

Furthermore, because plural target instructions can be processed collectively just by adding collective emulation coding for emulating each combination of plural target instructions collectively to the coding processes without modifying the exiting coding processes for executing conventional target instructions, ending processings of individual target instructions, etc. Thus the existing resources (for coding) are never wasted.

BRIEF DESCRIPTION OF THE DRAWINGS

FIG. 4 is an explanatory diagram of a coding example of addt and subt instructions;

FIG. 5 is a coding diagram for showing a concrete example of fetching and decoding of addt and subt instructions;

FIG. 6 is a coding diagram for showing a concrete example of the execution of the addt instruction;

FIG. 7 is a coding diagram of a concrete example of the execution of the subt instruction;

FIG. 8 is a coding diagram of a concrete example for the ending processings of the addt and subt instructions;

FIG. 9 is a coding diagram of a concrete example for fetching and decoding the addt and subt instructions collectively;

FIG. 10 is a coding diagram of a concrete example for executing addt and subt instructions collectively;

FIG. 11 is a coding diagram of a concrete example for the ending processings of the addt and subt instructions collectively;

FIG. 12 is a coding diagram of a concrete example for fetching and decoding three or more target instructions collectively;

FIG. 13 is a coding diagram of a concrete example for fetching and decoding three or more target instructions collectively;

FIG. 14 is a diagram of an example of a process branch table used for a computer system in a second embodiment;

FIG. 18 is a diagram of an example of an instruction combination history table used in a third embodiment;

FIG. 19 is a diagram of another example of the instruction combination history table used in the third embodiment;

DETAILED DESCRIPTION OF THE EXEMPLARY EMBODIMENTS

Hereunder, the preferred embodiments of the present invention will be described with reference to the accompanying drawings.

The computer system of the present invention includes an emulator (emulation program), which is provided with functions for processing plural target instructions collectively, thereby improving the emulation speed of the target system. Concretely, in case where plural target instructions to be processed collectively are combined for emulation, those target instructions, which are created beforehand, are branched to collective emulation coding and processed collectively according to the coding.

(First Embodiment)

Figures 1, 2:
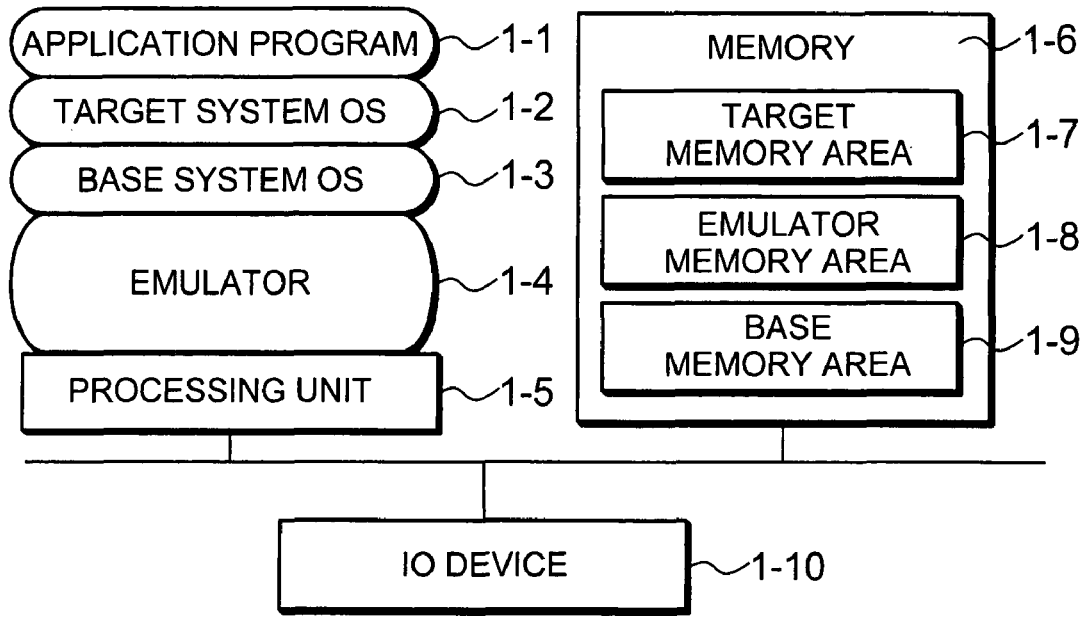
FIG. 1 is a block diagram of an example of a configuration of a computer system of the present invention.
FIG. 2 is an example of an instruction combination table used for the computer system in a first embodiment of the present invention.

FIG. 1 shows a block diagram of a computer system of the present invention.

As shown in FIG. 1, the computer system of the present invention comprises a processing unit 1-5 that includes a processor (VCPU); a memory 1-6 for storing programs and information required for the processings of the processing unit 1-5; and an input device for inputting commands, information, etc. to the processing unit 5-1 or an IO device (Input Output), which is used to monitor results of processings of the processing unit 5-1.

The memory 1-6 includes a target memory area 1-7 for storing a target system OS; an emulator memory area 1-8 for storing an emulation program (emulator 1-4); and a base memory area 1-9 for storing a base system OS.

The memory 1-6 also stores an instruction combination table to be described later and a process branch table or instruction combination history table that are all used by an emulation method of the present invention. The memory 6-1 may be any of such recording media as a semiconductor memory, a magnetic disk, an optical disk, or the like.

The processing unit 1-5 reads the emulation program stored in the emulator memory area 1-8 first, then executes processings of the emulation method of the present invention according to the emulation program to substitute instructions of the target system OS 1-2 for instructions of the base system OS 1-3 and execute processings of an application program that runs on the target system OS 1-2.

In this first embodiment, individual emulation coding for emulating target instructions individually and collective emulation coding for emulating plural target instructions collectively are created beforehand and stored in the emulator memory area 1-8 beforehand. Upon an execution of emulation, the processing unit 1-5 fetches plural target instructions individually and refers to the instruction combination table created beforehand to determine whether or not it is possible to process those fetched instructions collectively, If it is possible, those instructions are branched to the collective emulation coding and processed collectively according to the coding. On the other hand, if it is not possible to process those instructions in the combination collectively, a preceding target instruction selected from those fetched is branched to the individual emulation coding and processed individually according to the coding.

In the instruction combination table, the first target instructions are described in rows and the succeeding second target instructions are described in columns as shown in FIG. 2. Also in the table, "OK" or "NG" denotes for each combination of three instructions about whether or not it can be processed collectively. In the coding example shown in FIG. 2, a collective processing is possible for the combination B of the first target instructions and for the combination A of the second target instructions and not possible for other combinations.

Instructions A to C are usable for the target program. The types of instructions may not be limited only to those three as shown in FIG. 2; the number of types may be increased or decreased according to the target program.

In the instruction combination table shown in FIG. 2, the preceding first target instructions are described in rows and the succeeding second target instructions are described in columns, but the preceding first target instructions may be described in rows and the succeeding second target instructions may be described in columns.

The number of instruction combination tables provided for the computer system may not be only one; plural instruction combination tables may be provided.

While FIG. 2 shows an example of an instruction combination table denoting whether or not it is possible to process each combination of two target instructions collectively. For a collective processing of three or more target instructions, however, it is just required beforehand to create an instruction combination table for denoting whether or not it is possible to subject each combination of target instructions to a collective processing according to the number of instructions. In this case, it is just required beforehand to create collective emulation coding for those three or more target instructions.

Next, an emulation method in the first embodiment will be described with reference to FIG. 3.

Figure 3:
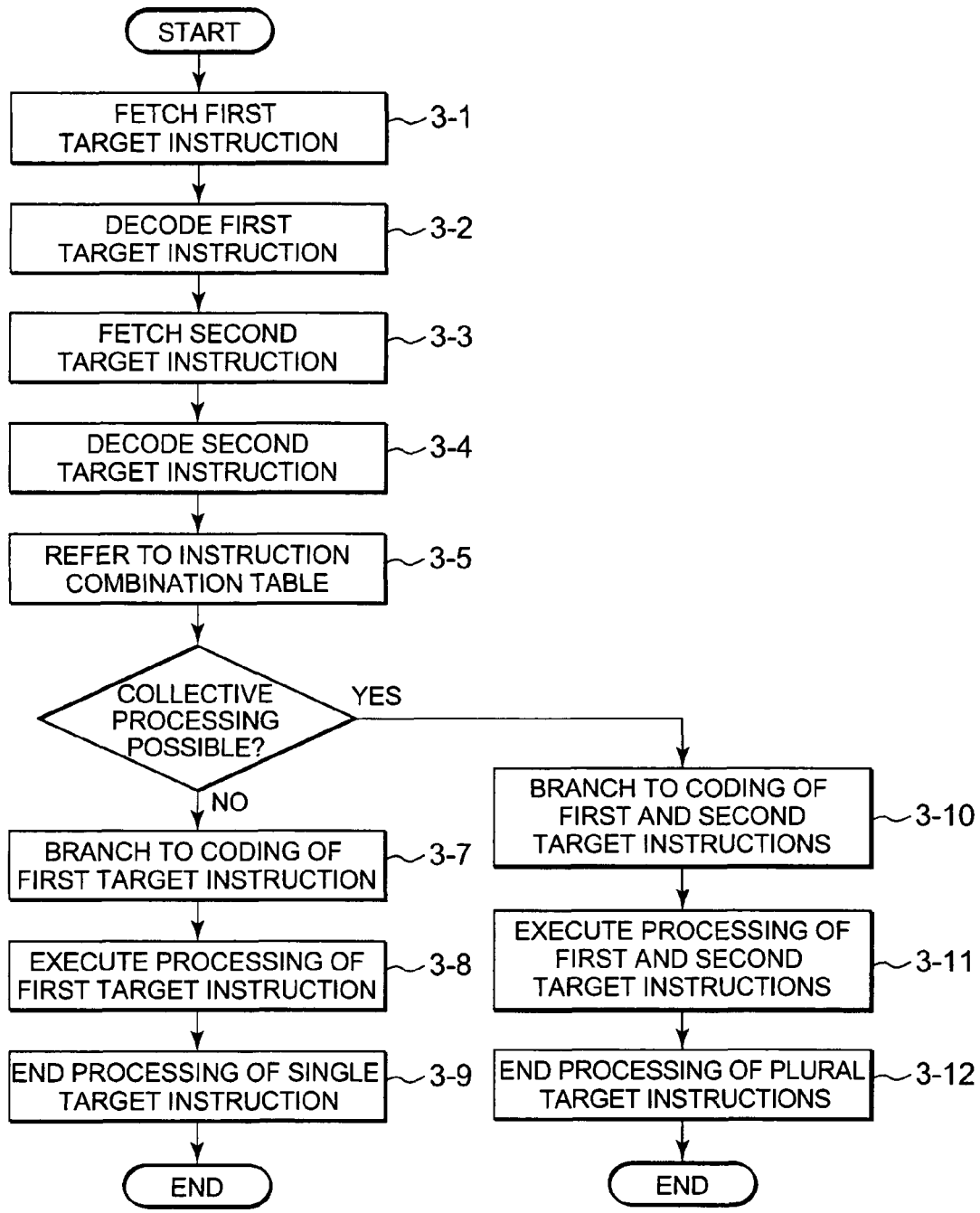
FIG. 3 is a flowchart of the processing procedures of the computer system in the first embodiment of the present invention.

FIG. 3 shows a flowchart of the processing procedures of the computer system in the first embodiment of the present invention. In FIG. 3, it is assumed that two target instructions are processed collectively.

As shown in FIG. 3, at first the processing unit 1-5 fetches a preceding first target instruction (step 3-1) and decodes the instruction (step 3-2). Then, the processing unit 1-5 fetches a succeeding second target instruction (step 3-3) and decodes the instruction (step 3-4).

After that, the processing unit 1-5 refers to the instruction combination table shown in FIG. 2 according to the decoding results of the first and second target instructions (step 3-5) to determine whether or not it is possible to process those target instructions collectively (step 3-6).

If it is possible, the processing unit 1-5 branches to the collective emulation coding for the first and second target instructions (step 3-10) and executes the processing of those target instructions collectively according to the coding (step 3-11). Ending the processing, the processing unit 1-5 executes a predetermined ending processing for the first and second target instructions (step 3-12).

On the other hand, if it is not possible to process the first and second target instructions collectively (determined so in step 3-6), the processing unit 1-5 branches to the individual emulation coding for a preceding first target instruction (step 3-7) and processes the instruction according to the coding (step 3-8). Ending the processing, the processing unit 1-5 executes a predetermined ending processing for the instruction (step 3-9) While only one (first) target instruction is fetched in step 3-1 shown in FIG. 3, two or more target instructions may be fetched collectively in step 3-1 or one by one in step 3-1.

While only one (first) target instruction is decoded in step 3-2 shown in FIG. 3, two or more target instructions may be decoded collectively or one by one in step 3-2 if two or more target instructions are fetched collectively in step 3-1.

While two target instructions are processed collectively in step 3-11 shown in FIG. 3, if two or more target instructions are fetched and decoded collectively, those target instructions may be processed collectively in step 3-11. The processing in step 3-11 shown in FIG. 3 may be executed in parallel to the ending processing of one target instruction in step 3-9 shown in FIG. 3.

Next, a description will be made concretely for a target instruction combination to be subjected to a collective processing.

In the following example, addt and subt are assumed as target instructions in a combination to be subjected to a collective processing and they are executed using the Intel Inc., IA 64 Instructions employed for the base system instructions.

FIG. 4 shows an explanatory diagram of examples for addt and subt instruction codes.

As shown in FIG. 4, the addt instruction is used to add up information (4 bytes) in a GR register (general-purpose register) specified by GR1 and the information (4 bytes) in a GR register specified by GR2 and store the result of the addition in a GR register specified by GR2.

The subt instruction is used to subtract the information (4 bytes) in a GR register specified by the GR4 from the information (4 bytes) in a GR register specified by the GR3 and store the result of the subtraction in a GR register specified by the GR4.

FIGS. 5 through 8 show concrete examples of the individual emulation coding for emulating the addt and subt instructions individually. FIG. 5 shows a concrete example for fetching and decoding the addt and subt instructions and FIG. 6 shows a concrete example for executing the addt instruction. FIG. 7 shows a concrete example for executing the subt instruction and FIG. 8 shows a concrete example for ending the processing of the addt and subt instructions.

FIGS. 9 through 11 show concrete examples for the collective emulation coding for emulating the addt ad subt instructions collectively. FIG. 9 shows a concrete example for fetching and decoding the addt abd subt instructions collectively and FIG. 10 shows a concrete example for executing the addt and subt instructions collectively. FIG. 11 shows a concrete example of ending the processing the addt and subt instructions collectively. In the case of the coding shown in FIGS. 9 through 11, there is no description for determining weather or not it is possible to process the two fetched target instructions collectively by referring to the instruction combination table. In this first embodiment, such a determination processing is also required. There are various types of target instruction combinations to be subjected to a collective processing respectively as described above.

Basically, there is no target instruction combination that cannot be subjected to a collective processing. However, if an execution time (the number of clocks) required for the processing of each target instruction before it is combined with others is equal to an execution time (the number of clocks) required for processing target instructions collectively, there is no merit in the collective processing. Consequently, there is no need to process target instructions in such a combination collectively.

In case where three or more target instructions are to be processed collectively, it is just required to fetch and decode those target instructions, for example, as shown in FIG. 12, then it is determined whether or not those target instructions in the combination can be processed collectively. In this case, if it is possible to process the instructions in the combination collectively, control is branched to the collective emulation coding to emulate those target instructions collectively. At that time, as shown in FIG. 13, in the steps of fetching and decoding the next target instruction or in the step of fetching and decoding the target instruction after the next, it is possible to determine whether or not those fetched instructions are combined so as to be processed collectively and if not possible, control may be branched to the individual emulation coding for emulating a preceding target instruction. FIGS. 12 and 13 show coding examples for three target instructions to be processed collectively.

According to the computer system in this first embodiment, because plural target instructions can be processed collectively, the emulation speed can be improved without adding any emulation dedicated hardware to the base system.

Furthermore, plural target instructions can be processed collectively just by adding the collective emulation coding to the system coding processes without modifying the existing coding processes for executing conventional target instructions, ending the processing of each target instruction, etc. Thus the existing coding resources are never wasted.

(Second Embodiment)

Next, a computer system in a second embodiment of the present invention will be described with reference to the accompanying drawings.

The second embodiment aims at improving the emulation speed by using a process branch table instead of the instruction combination table used in the first embodiment. The computer system configuration is the same as that in the first embodiment, so that the description of the system configuration in this second embodiment will be omitted here.

As shown in FIG. 14, the process branch table stores process names denoting predetermined processes, instruction counters corresponding to those process names respectively, and information denoting coding branch destinations for processing plural target instructions collectively in the respective processes. The process names, instruction counters, and branch destinations are related at one-to-one-to-one correspondence.

Figure 15:
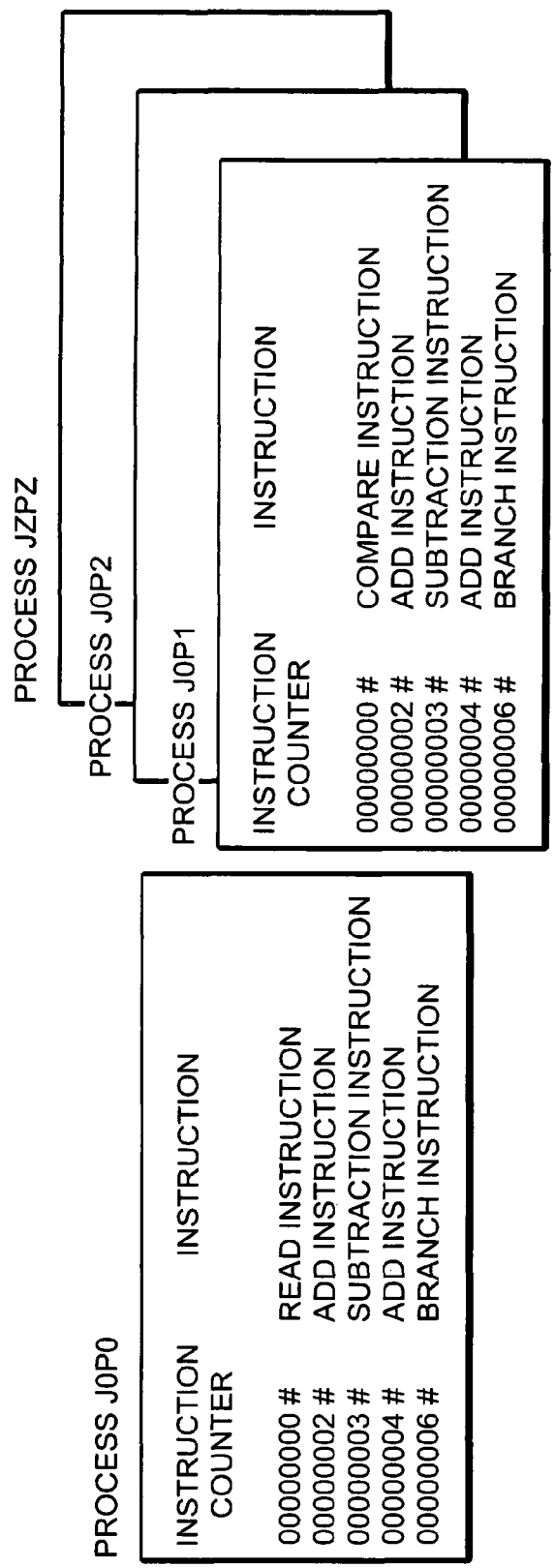
FIG. 15 is a table diagram for concretely showing process names in the process branch table and for showing instruction counters and target instructions in the table.

FIG. 15 shows a concrete example of denoting each process name and an instruction counter and a target instruction corresponding to the process name. FIG. 15 also represents each process name by a combination of J(0 to Z) and P(0 to Z).

In case where a combination of an instruction counter and a target instruction corresponding to a specific process name is fixed, the processing unit can process plural target instructions just by referring to the process branch table. Thus both instruction fetching and decoding processings can be omitted.

Each processing that uses the process branch table such way is effective when it is known beforehand that a combination of plural target instructions can be processed collectively in a predetermined process.

In the process branch table shown in FIGS. 14 and 15, one instruction counter and one coding branch destination correspond to each process name. However, in case where plural target instructions can be identified, the process branch table may consist of any information items.

While one process name corresponds to a pair of one instruction counter and one coding branch destination in the process branch table shown in FIGS. 14 and 15, one process may also correspond to plural instruction counters and plural coding branch destinations.

Figure 16:
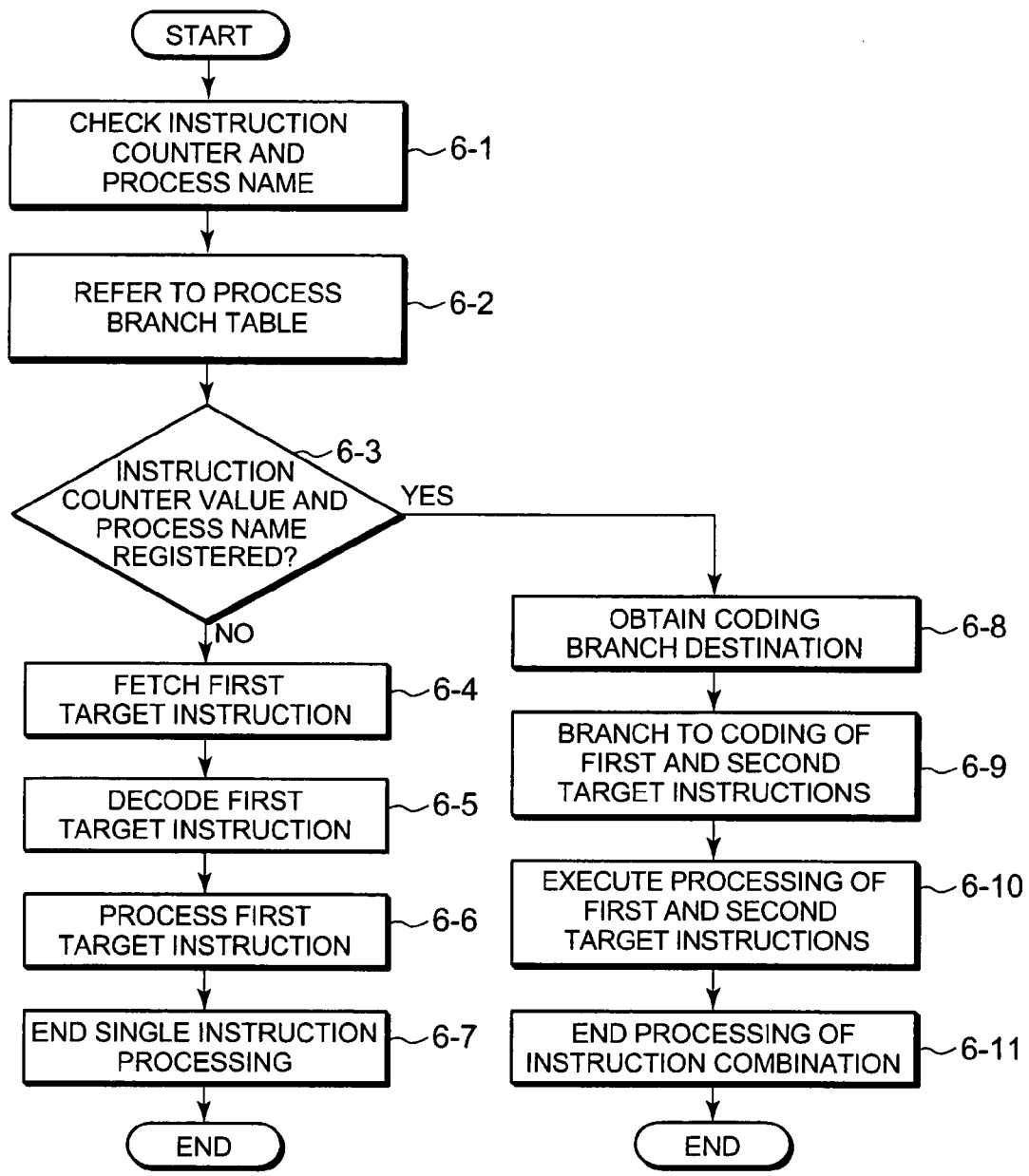
FIG. 16 is a flowchart of the processing procedures of the computer system in the second embodiment of the present invention.

FIG. 16 shows a flowchart of an example of the processing procedures of the computer system in the second embodiment of the present invention. In FIG. 16, it is assumed that a process consists of two target instructions to be processed collectively.

As shown in FIG. 16, at first, the processing unit reads an instruction counter value and a process name (step 6-1) and refers to the process branch table shown in FIG. 14 according to the instruction counter value and the process name (step 6-2). Then, the processing unit determines whether or not the instruction counter value and the process name are registered in the table (step 6-3). If they are registered in the table, the processing unit obtains the information of the coding branch destination (step 6-8) and branches to the collective emulation coding for emulating the first and second target instructions collectively (step 6-9). Then, the processing unit executes the processing of the first and second target instructions collectively (step 6-10). Ending the processing, the processing unit executes a predetermined ending processing corresponding to the first and second target instructions (step 6-11).

On the other hand, if it is determined in step 6-2 that the instruction counter value and the process name are not registered in the process branch table, the processing unit fetches a preceding first target instruction (step 6-4) and decodes the instruction (step 6-5). After that, the processing unit executes the processing of the first target instruction according to the decoding result (step 6-6). Ending the processing, the processing unit executes a predetermined ending processing corresponding to the first target instruction (step 6-7).

Figure 17:
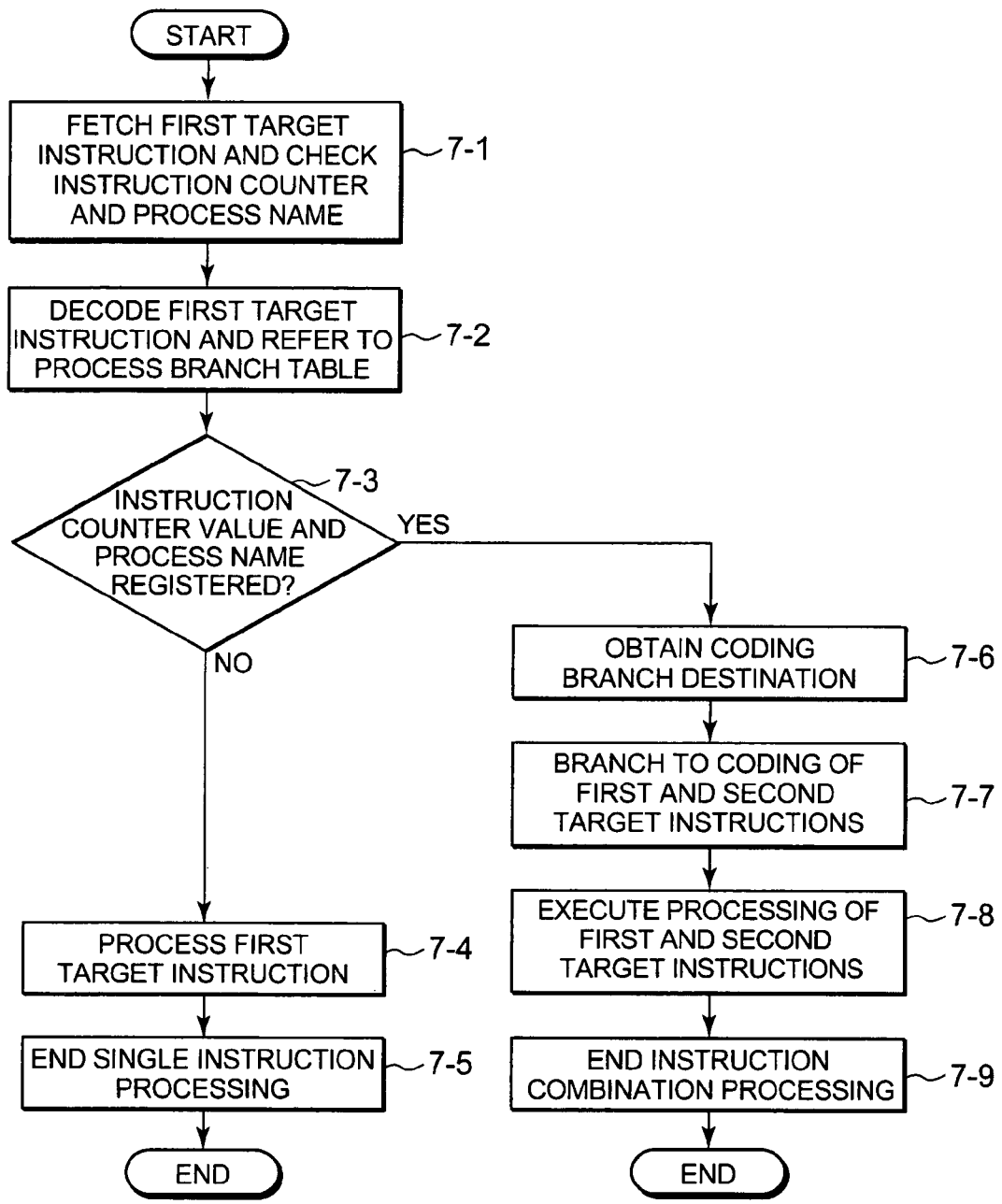
FIG. 17 is another flowchart of the processing procedures of the computer system in the second embodiment of the present invention.
Figure 24:
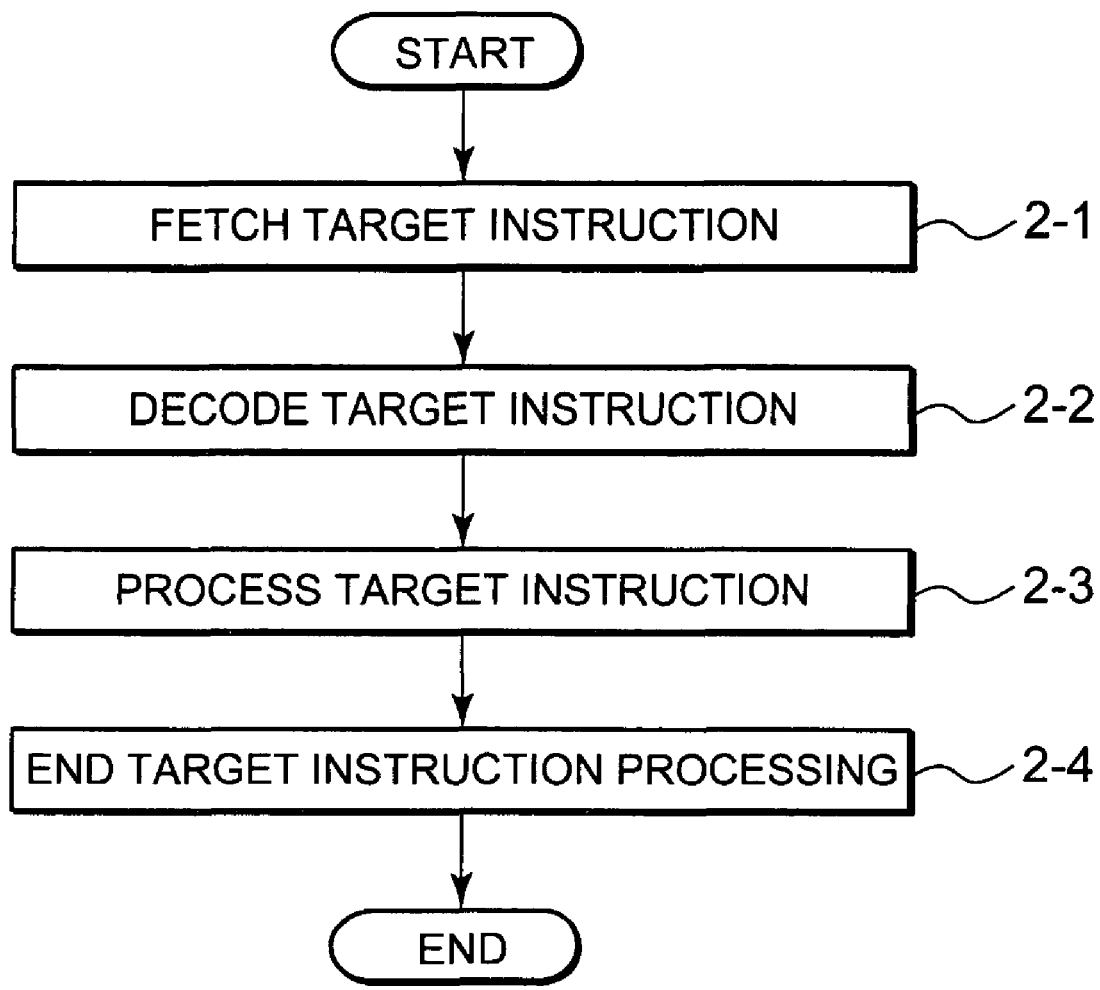
FIG. 24 is a flowchart of the processing procedures of a conventional emulation method.

Here, note that the processing procedures shown in FIG. 16 include a problem that the emulation slows down, since the number of processings increases more than the conventional processing shown in FIG. 24 in case where the instruction counter value and the process name are not registered in the process branch table, that is, in case where plural target instructions cannot be processed collectively. This is because the procedures require additional processings of checking the instruction counter value and the process name, as well as determining whether or not it is possible to process plural target instructions collectively by referring to the process branch table. FIG. 17 shows the processing procedures by which the above problem is deleted.

FIG. 17 shows a flowchart of another example of the processing procedures of the computer system in the second embodiment of the present invention. Similarly to FIG. 16, FIG. 17 shows the processing procedures for a process consisting of two target instructions to be processed collectively.

As shown in FIG. 17, at first, the processing unit 1-5 fetches a preceding first target instruction and reads the instruction counter value and the process name corresponding to the instruction (step 7-1). Then, the processing unit decodes the first target instruction and refers to the process branch table shown in FIG. 14 according to the instruction counter value and the process name (step 7-2).

After that, the processing unit determines whether or not the instruction counter value and the process name are registered in the process branch table (step 7-3). If they are registered in the table, the processing unit obtains the information of the coding branch destination corresponding to the instruction counter value and the process name (step 7-6) and branches to the collective emulation coding to emulate those instructions collectively according to the coding (step 7-7). Then, the processing unit executes the processing of the first and second target instructions collectively (step 7-8). Ending the processing, the processing unit executes a predetermined ending processing corresponding to the first and second target instructions (step 7-9).

On the other hand, if the instruction counter value and the process name are not registered in the process branch table, the processing unit executes the processing of the first target instruction according to the decoding result of the first target instruction in step 7-2 (step 7-4). Ending the processing, the processing unit executes a predetermined ending processing corresponding to the first target instruction (step 7-5).

The processing procedures shown in FIG. 17 can suppress the slowdown of the emulation speed more than the processing procedures shown in FIG. 16, since fetching and decoding of the first target instruction are already ended even when it is determined in step 7-3 that the instruction counter value and the process name are not registered in the process branch table.

While only one (first) target instruction is fetched in step 6-4 shown in FIG. 16 and in step 7-1 shown in FIG. 17, two or more target instructions may be fetched collectively or one by one in those steps.

While one target instruction (the first target instruction) is decoded in step 6-5 shown in FIG. 16 and in step 7-2 shown in FIG. 17, if two or more target instructions are fetched, those target instructions may be decoded collectively or one by one in those steps.

While two target instructions are processed collectively in step 6-9 shown in FIG. 16 and in step 7-8 shown in FIG. 17, if two or more target instructions are decoded collectively, those target instructions may be processed collectively.

And the processing in step 6-9 shown in FIG. 16 may be executed in parallel to the ending processing of a single target instruction in step 6-7 shown in FIG. 16 and the processing in step 7-8 shown in FIG. 17 may be,executed in parallel to the ending processing of a single target instruction in step 7-5 shown in FIG. 17.

Similarly to the first embodiment, even in the case of the computer system in this second embodiment, the emulation speed can be improved without requiring addition of any emulation dedicated hardware to the base system.

Furthermore, existing coding resources are never wasted, since plural target instructions can be processed collectively just by adding collective emulation coding to the system coding processes without modifying the existing coding processes for executing conventional target instructions, ending each target instruction processing, etc.

Particularly, in this second embodiment, in case where a combination of an instruction counter and a target instruction corresponding to a specific process name is fixed, plural target instructions can be processed collectively just by referring to the process branch table. Thus the instruction fetching and decoding processings can be omitted.

(Third Embodiment)

Next, a computer system of the present invention in a third embodiment will be described with reference to the accompanying drawings.

The third embodiment aims at improving the emulation speed by using an instruction combination history table. The configuration of the computer system is the same as that in the first embodiment, so that the description for the system configuration in this third embodiment will be omitted here.

FIG. 18 shows a diagram for showing an example of the instruction combination history table used in this third embodiment. FIG. 19 shows another example of the instruction combination history table used in this third embodiment.

The instruction combination history table shown in FIG. 18 stores the last processed instruction combination among plural target instruction combinations processed collectively, as well as information denoting a branch destination to the coding for emulating those instructions collectively. The table shown in FIG. 18 stores a combination of a preceding first target instruction A and a succeeding target instruction B, as well as a branch destination of collective emulation coding for those target instructions A and B.

On the other hand, the table shown in FIG. 19 stores the last processed combination of target instructions among plural target instruction combinations processed collectively, as well as a branch destination of the collective emulation coding for those instructions with respect to each type of the preceding target instructions.

The table shown in FIG. 19 stores a combination of a preceding first target instruction A and a succeeding second target instruction B, as well as a branch destination of the collective emulation coding for those instructions with respect to the instruction A. Similarly, a combination of a preceding first target instruction B and a succeeding second target instruction C, as well as a branch destination of the collective emulation coding for those instructions B and C with respect to the instruction B. In FIG. 19, because an instruction combination that includes the instruction C as the first target instruction and its coding branch destination are not registered in the table, the target instruction combination is never processed.

In FIGS. 18 and 19, the instruction combination history table stores a target instruction combination and its coding branch destination as a pair. However, the instruction combination history table may consist of any type of information items, if it is possible to identify each combination history of plural target instructions processed collectively.

Furthermore, while the instruction combination history table shown in FIG. 18 stores a pair of a combination of target instructions and its corresponding coding branch destination and the instruction combination history table shown in FIG. 19 shows a pair of a combination of target instructions and its corresponding coding branch destination with respect to each type of preceding first target instructions. However, the table may store plural pairs consisting of a combination of target instructions and its corresponding coding branch destination respectively.

Figure 20:
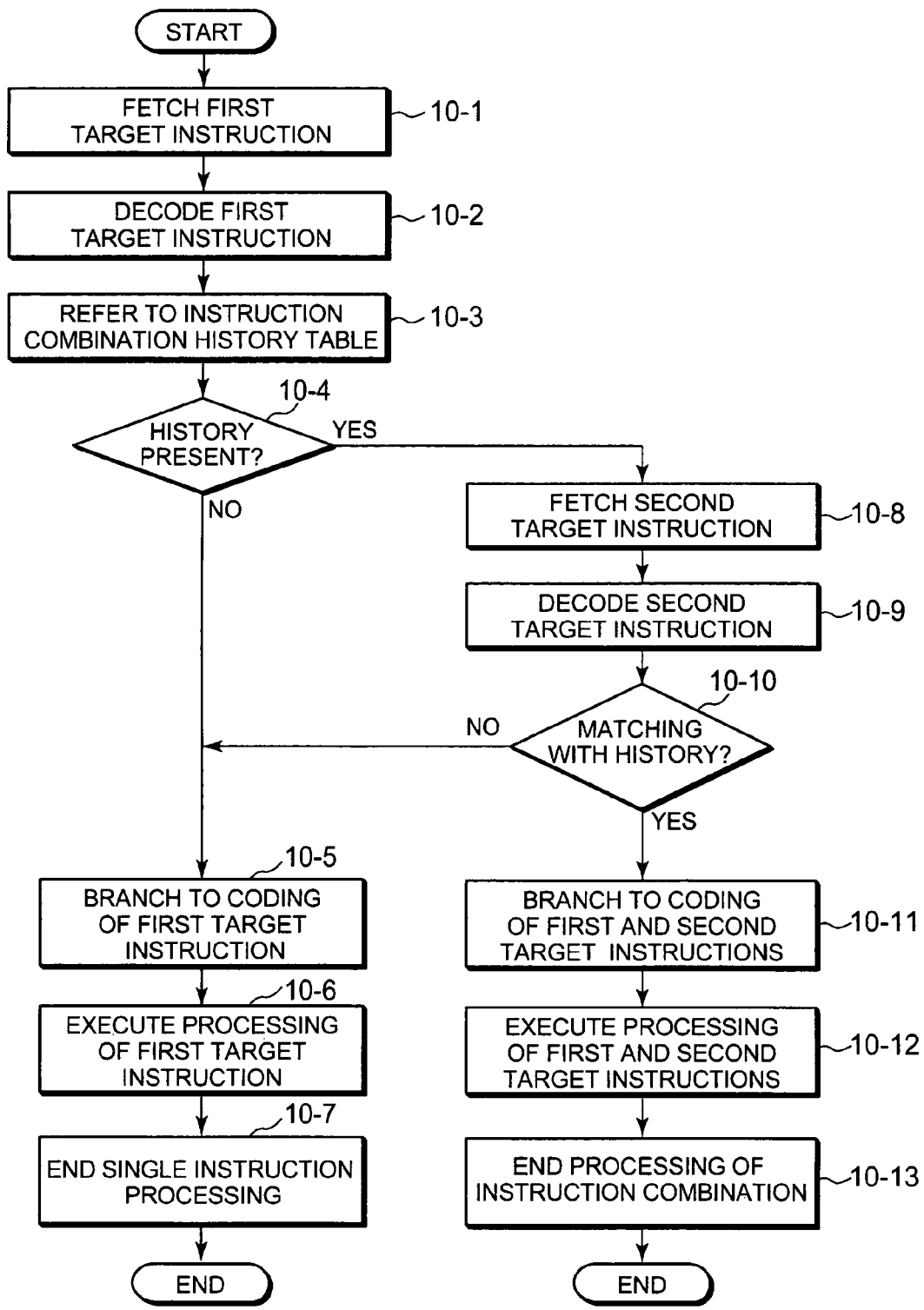
FIG. 20 is a flowchart of the processing procedures of a computer system in a third embodiment of the present invention.

FIG. 20 shows a flowchart of an example of the processing procedures of the computer system in the third embodiment of the present invention.

As shown in FIG. 20, at first, the processing unit fetches a preceding first target instruction (step 10-1), then decodes the instruction (step 10-2). After that, the processing unit refers to the instruction combination history table shown in FIG. 19 (step 10-3) to determine whether or not a combination of target instructions and a coding branch destination corresponding to the decoded first target instruction are registered in the table (step 10-4).

If they are registered, the processing unit fetches a succeeding second target instruction (step 10-8) and decodes the instruction (step 10-9).

After that, the processing unit determines whether or not the combination of the first and second target instructions is registered in the instruction combination history table (step 10-10). If they are registered in the table, the processing unit branches to the collective emulation coding for emulating those first and second target instructions collectively (step 10-11). Then, the processing unit executes the collective processing of the first and second target instructions (step 10-12). Ending the processing, the processing unit executes a predetermined ending processing for the first and second target instructions (step 10-13).

On the other hand, in case where it is determined in step 10-4 that the instruction combination and the coding branch destination corresponding to the first target instruction are not registered in the instruction combination history table or determined in step 10-10 that the combination of the first and second target instructions is not registered in the instruction combination history table, the processing unit branches to the individual emulation coding for the first target instruction according to the decoding result instep 10-2 (step 10-5). Then, the processing unit executes the processing of the first target instruction (step 10-6). Ending the processing, the processing unit executes a predetermined ending processing corresponding to the instruction (step 10-7).

The computer system in the first embodiment cannot refer to the instruction combination table before completion of the second target instruction decoding as shown in FIG. 3. However, the computer system in the third embodiment can refer to the instruction combination history table before the completion of the second target instruction fetching and decoding if the first target instruction can be identified through decoding as shown in FIG. 20. Thus it is possible to obtain the result of the reference to the instruction combination history table more quickly than the reference to the instruction combination table.

In case where the processing unit refers to the instruction combination table used the first embodiment, the processing unit is required to compare each combination of plural decoded target instructions with each entry in the instruction combination table. However, because there is only one entry to be compared in the instruction combination history table used in this third embodiment, the processing unit can obtain the result of the reference to the table more quickly.

As described above, in the processings shown in FIG. 20, only the last processed combination of target instructions is registered in the instruction combination history table among plural target instruction combinations processed collectively. Consequently, if processed target instruction combinations are changed one after another, the processing unit comes to process target instructions individually even when the subject target instruction combination can be processed collectively.

Figure 21:
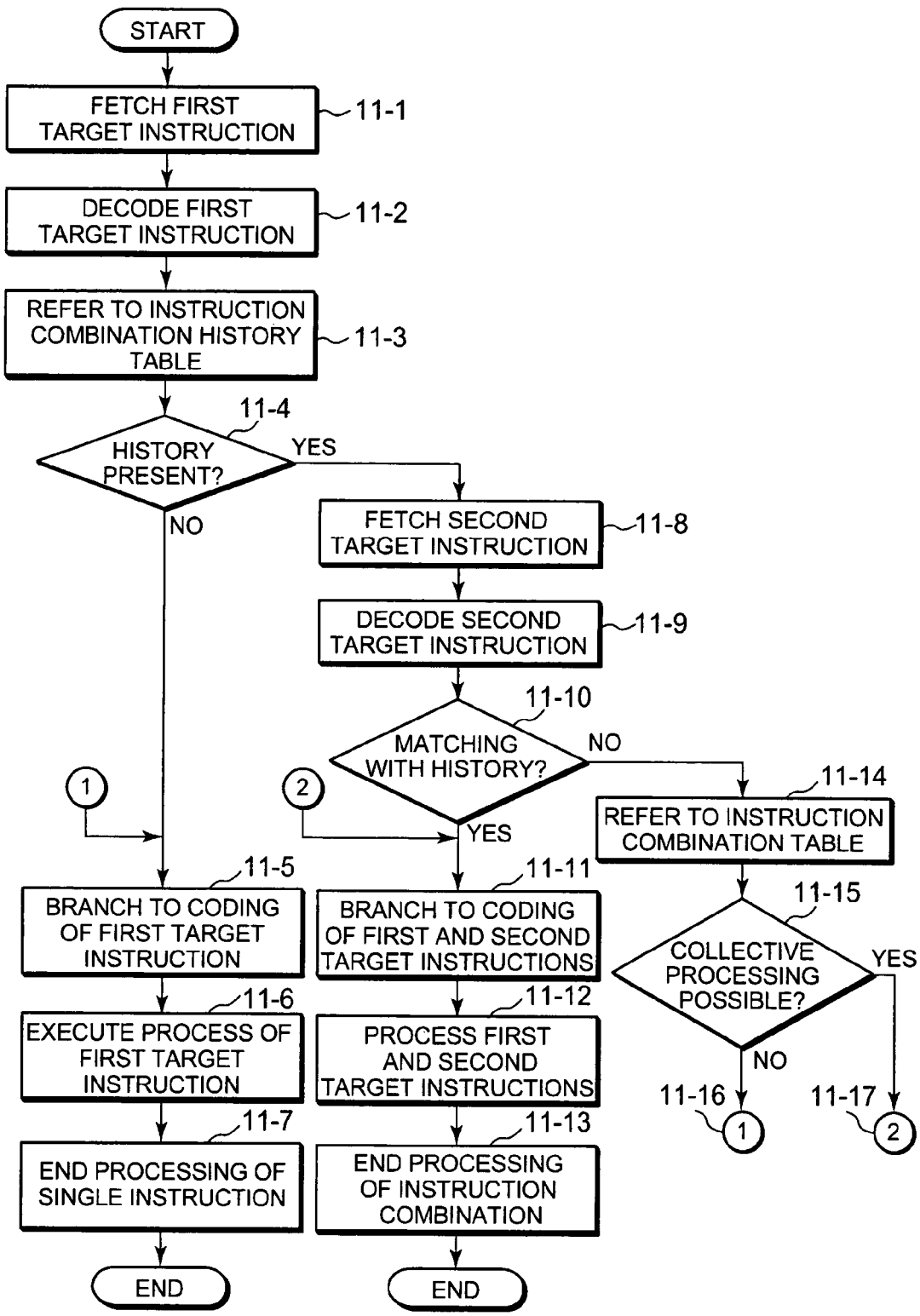
FIG. 21 is another flowchart of the processing procedures of the computer system in the third embodiment of the present invention.

FIG. 21 shows an example of the reference to the instruction combination table described in the first embodiment and the instruction combination history table described above to solve the above problem respectively.

FIG. 21 shows a flowchart of another example of the processing procedures of the computer system in the third embodiment of the present invention.

As shown in FIG. 21, at first the processing unit fetches a preceding first target instruction (step 11-1) and decodes the instruction (step 11-2). Then, the processing unit refers to the instruction combination history table shown in FIG. 18 or 19 (step 11-3) to determine whether or not the instruction combination and the coding branch destination corresponding to the decoded target first instruction are registered in the table (step 11-4).

If they are registered, the processing unit fetches a succeeding second target instruction (step 11-8) and decodes the instruction (step 11-9).

After that, the processing unit determines whether or not the combination of the first and second target instructions is registered in the instruction combination history table (step 11-10). If the combination is registered, the processing unit branches to the collective emulation coding for emulating the combination (step 11-11). Then, the processing unit executes the processing of those first and second instructions collectively (step 11-12). Ending the processing, the processing unit executes a predetermined ending processing corresponding to the first and second target instructions (step 11-13).

If it is determined in step 11-4 that the instruction combination and the coding branch destination corresponding to the first target instruction are not registered in the instruction combination history table, the processing unit branches to the individual emulation coding for emulating the first target instruction according to the decoding result of the first target instruction in step 11-2 (step 11-5). Then, the processing unit executes the processing of the first target instruction (step 11-6). Ending the processing, the processing unit executes a predetermined ending processing corresponding to the instruction (step 11-7).

If it is determined in step 11-10 that the combination of the first and second target instructions is not registered in the instruction combination history table, the processing unit refers to the instruction combination table (step 11-14) to determine whether or not it is possible to process the first and second instructions collectively (step 11-15).

If it is possible, the processing unit goes to step 11-16 to execute the processings in steps 11-11 to 11-13. If it is not possible, the processing unit goes to step 11-17 to execute the processings in steps 11-5 to 11-7.

In the case of the processing procedures shown in FIG. 21, it is possible to process plural target instructions collectively if the instruction combination can be subjected to collective emulation even when combinations of target instructions to be processed are changed one after another. Furthermore, if it is determined that the first and second target instructions can be processed collectively as a result of the reference to the instruction combination history table, there is no need to refer to the instruction combination table. Thus the emulation speed degradation to be caused by the reference to the instruction combination table can be suppressed.

While the processing unit fetches only one target instruction (the first target instruction) in step 10-1 shown in FIG. 20 and in step 11-1 shown in FIG. 21, two or more target instructions may be fetched collectively or one by one in those steps.

While the processing unit decodes only one target instruction (the first target instruction) in step 10-2 shown in FIG. 20 and in step 11-2 shown in FIG. 21, two or more target instructions may be decoded collectively or one by one in those steps.

While the processing unit processes two target instructions in step 10-12 shown in FIG. 20 and in step 11-12 shown in FIG. 21, if two or more target instructions are fetched and decoded, those target instructions may be processed collectively.

Furthermore, the processing in step 10-12 may be executed in parallel to the ending processing of a single target instruction in step 10-7 shown in FIG. 20 and the processing in step 11-12 shown in FIG. 21 may be executed in parallel to the ending processing of a single target instruction in step 11-7 shown in FIG. 21.

According to the computer system in this third embodiment, therefore, it is possible to obtain the same effect of the first embodiment and further another effect that the result of the reference to each table can be obtained more quickly, thereby the emulation speed is more improved.

(Fourth Embodiment) Next, a computer system in a fourth embodiment of the present invention will be described with reference to the accompanying drawings.

In this fourth embodiment, the emulation speed is improved by referring to the instruction combination table and the process branch table or instruction combination history table shown in the first to third embodiments with respect to the next target instruction and the target instruction after the next in parallel to the processing of the preceding target instruction.

Figure 22:
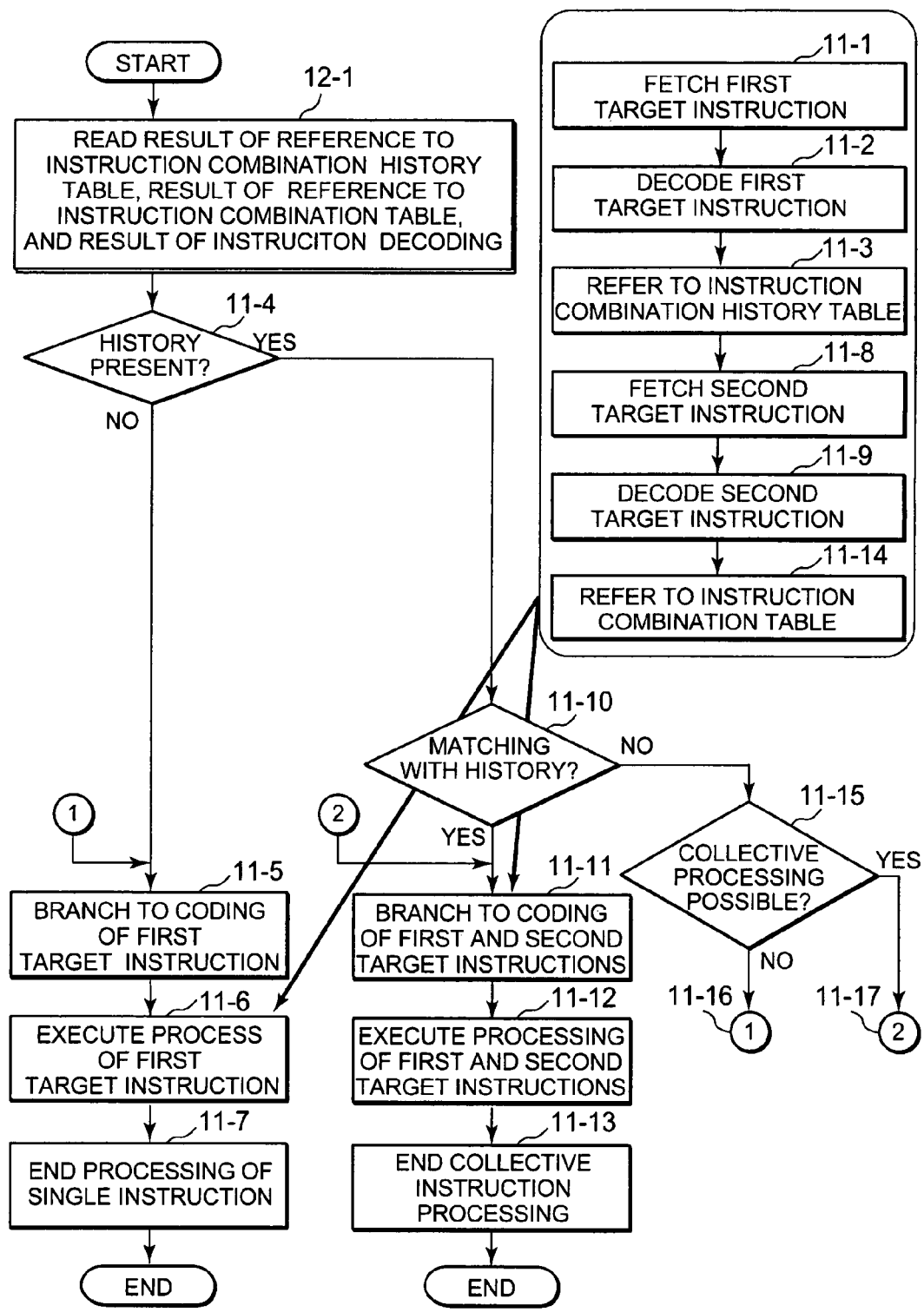
FIG. 22 is a flowchart of the processing procedures of a computer system in a fourth embodiment of the present invention.

FIG. 22 is a flowchart of the processing procedures of the computer system in this fourth embodiment of the present invention. FIG. 22 shows an example in which the fourth embodiment is applied to the processing procedures in the third embodiment shown in FIG. 21. The fourth embodiment can also apply to the processings in the first embodiment shown in FIG. 3, the processings in the second embodiment shown in FIG. 17, and the processings in the third embodiment shown in FIG. 20.

As shown in FIG. 22, in the fourth embodiment, in parallel to the processings of the first and second target instructions in steps 11-1 to 11-3, 11-8 to 11-9, and 11--14 shown in FIG. 21, the processing unit fetches a third target instruction to be executed next (step 11-1), decodes the third target instruction (11-2), refers the instruction combination history table (step 11-3), fetches a fourth target instruction following the third target instruction (step 11-8), decodes the fourth target instruction (step 11-9), and refers to the instruction combination table (step 11-14) respectively.

Upon the processing of the third and fourth target instructions, the processing unit reads the result of the preceding reference to the instruction combination history table, the result of the reference to the instruction combination table, and the instruction decoding result respectively to execute the same processings in steps 11-4 to 11-17 as those in the third embodiment shown in FIG. 21.

The computer system in this fourth embodiment can improve the emulation speed by changing the balance of the processing time load such way.

In FIG. 22, one processor executes the references to the instruction combination history table and to the instruction combination table with respect to the next third target instruction and the fourth target instruction to be processed after the next, as well as the processings of the first and second target instructions in parallel. However, if the processing unit is provided with plural processors, those processings may be executed by those processors differently in parallel. Even in such a case, this fourth embodiment can apply to the processings in the third embodiment shown in FIG. 21, as well as the processings in the first embodiment shown in FIG. 3, the processings in the second embodiment shown in FIGS. 16 and 17, and the processings in the third embodiment shown in FIG. 20.

Figure 23:
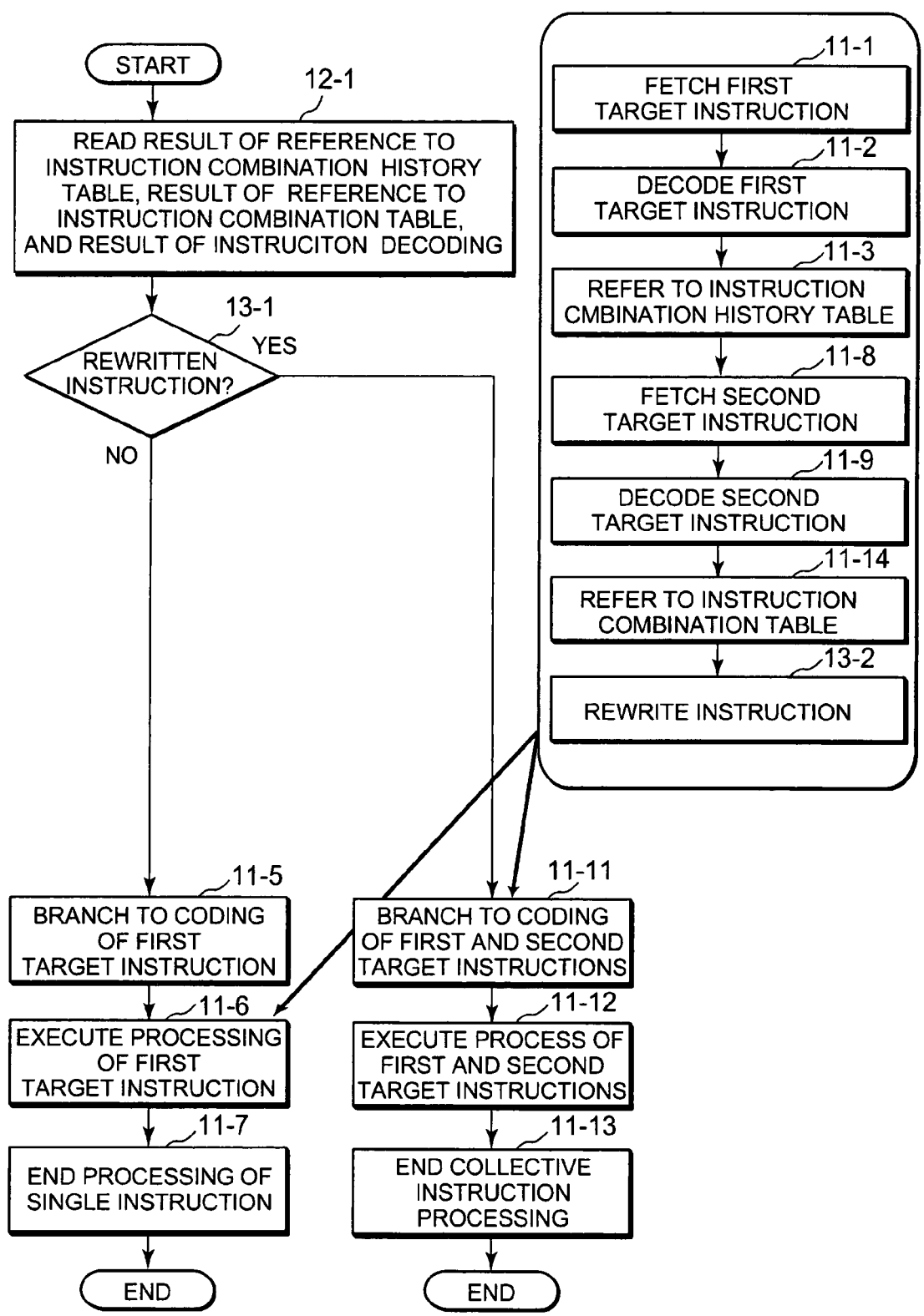
FIG. 23 is a flowchart of a variation of the processing procedures of the computer system in the fourth embodiment of the present invention.

Furthermore, in this fourth embodiment, as shown in FIG. 23, upon the reference to the instruction combination history table and the instruction combination table with respect to the third target instruction to be executed next and the fourth target instruction to be executed after the next, if the combination of the third and fourth target instructions can be processed collectively, a non-used instruction code may be used as the instruction for the collective processing.

In this case, upon the processing of the third and fourth target instructions, the processing unit reads the result of the reference to the instruction combination history table, the result of the reference to the instruction combination table, and the result of instruction decoding that are executed precedingly to determine whether or not the instruction codes of those instructions are rewritten to unused instruction codes respectively (step 13-1). If the instruction codes are rewritten, the processing unit executes the processings in steps 11-11 to 11-13 shown in FIG. 21 according to the instruction codes respectively.

If it is determined in step 13-1 that the instruction codes are not rewritten, the processing unit executes the processings in steps 11-5 to 11-7.

The processings shown in FIG. 23 can simplify the processings for references to the instruction combination table and the instruction combination history table, as well as for determination by rewriting instruction codes for processing the third target instruction to be processed next and the fourth target instruction to be processed after the next, thereby the processings in steps 11-10, 11-15, and 11-17 shown in FIG. 22 can be omitted.

Even in this case, this fourth embodiment can apply to the processings in the third embodiment shown in FIG. 21, as well as the processings in the first embodiment shown in FIG. 3, the processings in the second embodiment shown in FIGS. 16 and 17, and the processings in the third embodiment shown in FIG. 20.

According to the computer system in this fourth embodiment, therefore, in addition to the effects in the first and second embodiments, it is possible to obtain another effect that the emulation speed can be improved by changing the balance of the processing time load.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An emulation method, comprising the steps of:
creating beforehand an individual emulation coding, a collective emulation coding, and an instruction combination history table for denoting a relationship between a combination of a plurality of target instructions processed collectively and information denoting a branch destination of said collective emulation coding;
fetching, via a programmed processor, from a memory and decoding a plurality of target instructions which are called as current instructions hereafter; and
prior to the fetching from a memory the next target instruction to said current instructions, determining via a programmed processor whether or not it is possible to execute collective emulation for said current instructions based on the combination of said current instructions, and upon said determination being affirmative, branching to coding which is created in a memory beforehand, thereby executing said collective processing emulation according to said coding.

2. The emulation method according to claim 1, wherein the individual emulation coding is for emulating said plurality of target instructions individually, the collective emulation coding is for emulating said plurality of target instructions collectively, and the instruction combination history table denoting whether or not it is possible to execute said collective emulation processing for each combination of said target instructions,
and the method further comprises:
fetching and decoding said plurality of target instructions, then determining whether or not it is possible to execute said collective emulation for said plurality of target instructions by referring to said instruction combination table;
branching to said collective emulation coding when those instructions are combined so as to be processed collectively, then emulating those target instructions collectively according to said coding; and
And branching to said individual emulation coding when those instructions are not combined so as to be processed collectively, then emulating one target instruction according to said coding.

3. The emulation method according to claim 1, further comprising:
reading said identifying information and branching to said collective emulation coding when it is determined by referring to said process branch table that said identifying information is registered in said table, then executing said collective emulation according to said coding; and
fetching and decoding one target instruction when said identifying information is not registered in said table, then branching to said individual emulation coding to process said one target instruction according to said coding.

4. The emulation method according to claim 3, wherein said method further comprises executing simultaneously both of a processing for reading said identifying information, as well as a processing for fetching and decoding said one target instruction.

5. The emulation method according to claim 1, further comprising:
   fetching and decoding a plurality of target instructions and branching to said collective emulation coding when said combination of said plurality of target instructions processed collectively is registered in said instruction combination history table, then processing those instructions collectively according to said coding; and
   branching to said individual emulation coding when said combination is not registered in said table, then emulating said one target instruction according to said coding.

6. The emulation method according to claim 5, wherein the instruction combination history table further denotes whether or not it is possible to execute collective emulation for each combination of target instructions,
   and the method further comprises:
   determining whether or not it is possible to process said plurality of target instructions by referring to said instruction combination table when said combination is not registered in said table; and
   branching to said collective emulation coding when said combination can be subjected to said collective emulation, then processing those instructions collectively according to said coding.

7. The emulation method according to claim 6, wherein said method further comprises:
   executing simultaneously both of a processing for fetching and decoding a plurality of target instructions to be executed next and a processing for determining whether or not it is possible to process said plurality of target instructions collectively by referring to said instruction combination history table when a combination of said decoded plurality of target instructions is not registered in said table while said plurality of target instructions are processed according to said collective emulation coding or said individual emulation coding.

8. The emulation method according to claim 7, wherein said method uses different processors for executing the different steps of:
   branching to said collective emulation coding or said individual emulation coding; and
   fetching and decoding a plurality of target instructions to be executed next, then determining whether or not it is possible to process said plurality of target instructions collectively by referring to said instruction combination table when said combination of said decoded target instructions is not registered in said instruction combination history table.

9. The emulation method according to claim 7, further comprising:
   rewriting said plurality of target instructions to non-used instruction codes when a plurality of target instructions to be executed next can be processed collectively.

10. The emulation method according to claim 1, wherein the instruction combination history table further denoting whether or not it is possible to execute collective emulation for each combination of target instructions, and
    wherein a first target instructions are described in rows of said instruction combination table and said next target instructions of said current instructions are described in columns of said instruction combination history table.

11. A computer system, comprising:
    a processing unit configured to fetch from a memory and to decode a plurality of target instructions which are called as current instructions hereafter,
    wherein, prior to a fetching from a memory the next target instruction to said current instructions, the processing unit determines whether or not it is possible to execute collective emulation for said current instructions based on the combination of said current instructions, and upon said determination being affirmative, branches to coding which are created in memory beforehand, then processes said instructions collectively according to said coding; and
    a memory for storing said collective emulation coding, said memory storing an instruction combination history table for denoting said individual emulation coding, said collective emulation coding, and a relationship between each combination of a plurality of target instructions processed collectively and information denoting a branch destination to said collective emulation coding.

12. The computer system according to claim 11,
    wherein said memory further stores individual emulation coding for emulating target instructions created beforehand individually, collective emulation coding for emulating said plurality of target instructions collectively, and the instruction combination history table further denoting whether or not it is possible to execute said collective emulation for each combination of said target instructions, and
    wherein said processing unit is configured to execute the processing for:
    fetching and decoding a plurality of target instructions and determining whether or not it is possible process those instructions collectively by referring to said instruction combination table;
    branching to said collective emulation coding when those target instructions are combined so as to be processed collectively, then processing those instructions collectively according to said coding; and
    branching to said individual emulation coding when said instructions are not combined so as to be processed collectively, then processing one target instruction according to said coding.

13. The computer system according to claim 11,
    wherein said processing unit reads said identifying information and branches to said collective emulation coding when it is determined by referring to said process branch table that said identifying information is registered in said table, then branching to said collective emulation coding to process those instructions collectively according to said coding or fetches and decodes one target instruction when said identifying information is not stored in said table, then branching to said individual emulation coding to process said one target instruction according to said coding.

14. The computer system according to claim 13,
    wherein said processing unit executes both of a processing for reading said identifying information and a processing for fetching and decoding said one target instruction simultaneously.

15. The computer system according to claim 11,
    wherein said processing unit fetches and decodes a plurality of target instructions, then branches to said collective emulation coding when said combination of said plurality of target instructions is registered in said instruction combination history table, then processes those instructions collectively according to said coding, and branches to said individual emulation coding when said combination is not registered in said table, then processes one target instruction according to said coding.

16. The computer system according to claim 15,
wherein an the instruction combination history table further denoting whether or not it is possible to execute said collective emulation for each combination of said target instructions created beforehand, and
wherein said processing unit refers to said instruction combination table to determine whether or not it is possible to process said plurality of target instructions collectively when said combination of said plurality of decoded target instructions is not registered in said instruction combination history table; and branches to said collective emulation coding when those instructions are combined so as to be processed collectively, then processing those instructions collectively according to said coding.

17. The computer system according to claim 16,
wherein said processing units executes simultaneously both of a processing for fetching and decoding a plurality of target instructions to be processed next and a processing for referring to said instruction combination table to determine whether or not it is possible to process those instructions collectively when said combination of said decoded target instructions is not registered in said table while said plurality of target instructions are processed according to said collective emulation coding or said individual emulation coding.

18. The computer system according to claim 17,
wherein said processing unit further includes:
a first processor for executing a processing according to said collective emulation coding or said individual emulation coding; and
a second processor for fetching and decoding a plurality of target instructions to be processed next, then referring to said instruction combination table to determine whether or not it is possible to process said plurality of target instructions collectively when said combination of said plurality of decoded target instructions is not registered in said instruction combination history table.

19. The computer system according to claim 17,
wherein said processing unit rewrites said plurality of target instructions to non-used instruction codes when said combination of said plurality of target instructions to be processed next can be subjected to said collective emulation.

20. The computer system according to claim 11,
wherein the instruction combination history table further denoting whether or not it is possible to execute collective emulation for each combination of target instructions, and
wherein a first target instructions are described in rows of said instruction combination table and said next target instructions of said current instructions are described in columns of said instruction combination history table.

21. A program stored on a computer memory configured to enable a computer to execute emulation, including the steps of:
creating beforehand an individual emulation coding, a collective emulation coding, and an instruction combination history table for denoting a relationship between a combination of a plurality of target instructions processed collectively and information denoting a branch destination of said collective emulation coding;
fetching from a memory and decode a plurality of target instructions which are called as current instructions hereafter,
prior to the fetching from the memory the next target instruction to said current instructions, determining whether or not it is possible to execute collective emulation for said current instructions based on the combination of said current instructions, and upon said determination being affirmative, branches to coding which are created in memory beforehand, then enables said computer to process those emulation instructions collectively according to said coding.

22. The program stored on a computer memory according to claim 21,
wherein said program further enables said computer to execute the steps of:
fetching and decoding a plurality of target instructions, then referring to the instruction combination history table for denoting whether or not it is possible to execute collective emulation for each combination of said target instructions created beforehand to determine whether or not it is possible to process those instructions collectively;
branching to said collective emulation coding when said plurality of target instructions are combined so as to be processed collectively, then processing those instructions created beforehand collectively according to said coding; and
branching to said individual emulation coding for emulating one target instruction created beforehand when said target instructions are not combined so as to be processed collectively, then processing said one target instruction according to said coding.

23. The program stored on a computer memory according to claim 21,
wherein said program further enables said computer to execute the steps of:
reading information for identifying said plurality of target instructions;
referring to the instruction combination history table for denoting a relationship between said identifying information and a branch destination of said collective emulation coding;
branching to said collective emulation coding when said read identifying information is registered in said process branch table, then processing those instructions collectively according to said coding; and
fetching and decoding one target instruction according to the instruction combination history table, then branching to said individual emulation coding to process said one target instruction individually.

24. The program stored on a computer memory according to claim 23,
wherein said program further enables said computer to execute simultaneously both of a processing for reading said identifying information and a processing for fetching and decoding said one target instruction.

25. The program stored on a computer memory according to claim 21,
wherein said program further enables said computer to execute the steps of:
fetching and decoding a plurality of target instructions;
referring to said instruction combination history table for denoting a relationship between a combination of a plurality of target instructions created beforehand and processed collectively and information for denoting a branch destination of said collective emulation coding;

branching to said collective emulation coding to process those instructions collectively when said combination of said plurality of decoded target instructions is registered in said instruction combination history table; and branching to said individual emulation coding to process said one target instruction created beforehand when said combination is not registered in said table.

26. The program stored on a computer memory according to claim 25, wherein said program further enables said computer to execute the steps of:

referring to said instruction combination table to determine whether or not it is possible to process said plurality of target instructions collectively when said combination of said plurality of decoded target instructions is not registered in said instruction combination history table for denoting whether or not it is possible to execute said collective emulation for each target instruction combination; and branching to said collective emulation coding to process said target instructions collectively when said combination can be subjected to said collective emulation.

27. The program stored on a computer memory according to claim 26, wherein said program enables said computer to execute simultaneously both of a processing for fetching and decoding a plurality of target instructions to be processed next and a processing for referring to said instruction combination table to determine whether or not it is possible to process said plurality of target instructions collectively when said combination of said decoded target instructions is not registered in said instruction combination history table while said plurality of target instructions are processed according to said collective emulation coding or said individual emulation coding.

28. The program stored on a computer memory according to claim 27, wherein said program enables said computer to rewrite said plurality of target instructions to non-used instruction codes when a plurality of target instructions to be processed next can be processed collectively.

29. The program stored on a computer memory according to claim 21, wherein the instruction combination history table further denoting whether or not it is possible to execute collective emulation for each combination of target instructions, and wherein a first target instructions are described in rows of said instruction combination table and said next target instructions of said current instructions are described in columns of said instruction combination table.

* * * * *